3,312,656
REDUCTION OF COLD FLOW IN CIS-1,4 POLYBUTADIENE
Stanley Charles Einhorn, Dover, and Hendrik Kamiel de Decker, Montclair, N.J., assignors to Texas-U.S. Chemical Company, Parsippany, N.J., a corporation of Delaware
No Drawing. Filed Jan. 15, 1964, Ser. No. 337,728
13 Claims. (Cl. 260—41.5)

The present invention is directed to a novel cis 1,4-polybutadiene composition having improved properties.

It is an object of this invention to provide cis 1,4-polybutadiene rubbery compositions having high tensile strength and improved elongation characteristics. It is also an object of this invention to provide novel cis 1,4-polybutadiene rubbery compositions having good low temperature properties, improved cold flow characteristics, and good processability. It is a still further object of this invention to provide a process for producing novel cis 1,4-polybutadiene compositions having unusual physical properties.

We discovered that cis 1,4-polybutadiene compositions containing between 2.5 and 10 parts, and preferably between 3 to 7 parts, of thiolbenzoic acid per 100 parts of cis 1,4-polybutadiene have unusual physical properties that are a great improvement over known cis 1,4-polybutadiene compositions. The range of 2.5 to 10 parts by weight of thiolbenzoic acid corresponds to 1 to 4 mole percent of the thiolbenzoic acid based on moles of butadiene in the cis 1,4-polybutadiene rubber. The compositions containing the thiolbenzoic acid, as compared to similar compositions not containing the acid, have greatly improved tensile strength, improved elongation characteristics, improved cold flow characteristics, improved low temperature properties, and improved processability. These improved compositions are useful in preparation of many rubber products, e.g. tires, belts, mechanical goods, etc.

The cis 1,4-polybutadiene utilized in the preparation of the acid-containing compositions is the stereoregular rubber in which at least about 50% of the butadiene-1,3 units are joined cis-1,4; preferably at least 83% are in the cis form. These include the commercial products held out to be cis 1,4-polybutadiene and also the cis 1,4-polybutadienes prepared by any of the well-known methods widely described in the literature. Generally the polybutadiene homopolymers utilized will have a Mooney viscosity range of between about 20 and 100 and preferably between about 30 and 50. The usual commercial cis 1,4-polybutadiene rubbery compositions containing thiolbenzoic acid, will also contain other conventional compounding ingredients, such as vulcanizing agents, accelerators, anti-ozonants and anti-oxidants, carbon black and/or other fillers, pigments, softening agents, extenders, etc.

The thiolbenzoic acid is added to the cis 1,4-polybutadiene in a mixing apparatus at temperatures between about 70° F. and about 300° F. Suitable apparatus include standard mills (rolls) and Banbury mixers. The point of addition of the thiolbenzoic acid in the usual time sequence of addition of compounding agents to the rubbery mix is not critical. It is contemplated, however, that the thiolbenzoic acid will usually be added to the cis 1,4-polybutadiene in the heated mixing apparatus before the addition of the remaining compounds.

For purposes of further explaining the invention to those skilled in the art, the following illustrative examples are given.

In the examples, a standard commercially available cis 1,4-polybutadiene having a cis content of 89% and a raw Mooney viscosity (ML-4 @ 212° F.) of 40 was used.

To the polymer in the form a crumb, on a mill heated to 212° F., was added thiolbenzoic acid in amounts of 1, 1.5, and 3, mole percent as shown in the table. These correspond to 2.55, 3.8, and 7.1 parts per 100 parts of polybutadiene. Mixing was continued until the mix was homogenous. A portion of this material was set aside for the cold flow test described hereinafter. The following components were then added to the mill and a homogenous mix prepared; 50 parts of carbon black; 5 parts of zinc oxide; 2 parts of stearic acid; 5 parts of rosin; 5 parts of a highly aromatic oil; 1.75 parts of sulfur; and 0.9 part of a blend of N-oxydiethylene benzothiazol-2-sulfenamide and benzothiazyl disulfide; all parts are based on 100 parts of the cis 1,4-polybutadiene in the mix. The acid containing composition exhibited satisfactory processing characteristics. The mix was then divided into a number of portions which were rolled into sheets and cured at 292° F. for 25 minutes, 40 minutes, 55 minutes, and 100 minutes, respectively. Physical properties set forth in the table were obtained from micro tensile strips cut from 6 inch by 6 inch by 0.03 inch vulcanized sheets.

Cis 1,4-polybutadiene composition samples were prepared in a manner identical with that described in the preceding paragraph, except that there were no additions made of thiobenzoic acid. These test samples (I) were used for comparative purposes. During processing on the mill, these compositions exhibited poor processing characteristics over the normal processing range of 90° to 280° F. The processing characteristics were decidedly inferior to those of the compositions described in the preceding paragraph.

The cold flow of the uncured polymer composition was tested by allowing samples in the form of cylinders of 1.5 inches in diameter and 2 inches high, to stand under their own weight for the lengths of time indicated in the table. The 300% modulus test was carried out in accordance with the procedures set forth in ASTM D 412–61T. The Goodrich ΔT test was carried out in accordance with the procedures set forth in ASTM D 623–58. The other noted physical properties were obtained in accordance with conventional testing procedures.

TABLE

| Sample | I | II | III | IV |
|---|---|---|---|---|
| Cis 1,4-polybutadiene | 100 | 100 | 100 | 100 |
| Thiolbenzoic acid (phr.) | 0 | 2.55 | 3.8 | 7.1 |
| Raw Mooney (ML-4 at 212° F.) | 38 | 39 | 37 | 38 |
| Gel (percent) | 0 | 0 | 0 | 0 |
| Cold Flow, Percent loss in height: | | | | |
| After 21 days | 50 | 0 | 0 | 0 |
| After 50 days | | 0 | 0 | 0 |
| 300% modulus, p.s.i.: | | | | |
| 25' | 1,090 | 620 | 810 | 880 |
| 40' | 1,120 | 1,390 | 1,000 | 1,020 |
| 55' | 1,110 | 1,330 | 1,160 | 1,110 |
| 100' | 1,220 | 1,430 | 1,380 | 1,440 |
| Tensile strength, p.s.i.: | | | | |
| 25' | 1,880 | 2,260 | 2,630 | 2,210 |
| 40' | 2,580 | 2,820 | 2,580 | 2,630 |
| 55' | 2,490 | 2,950 | 2,690 | 2,840 |
| 100' | 2,220 | 2,480 | 2,710 | 2,600 |
| Percent elongation: | | | | |
| 25' | 450 | 730 | 650 | 630 |
| 40' | 390 | 490 | 530 | 580 |
| 55' | 380 | 460 | 510 | 560 |
| 100' | 390 | 420 | 480 | 450 |
| Shore A Hardness: | | | | |
| 25' | 68 | 49 | 50 | 50 |
| 40' | 58 | 54 | 55 | 56 |
| 55' | 60 | 55 | 58 | 57 |
| 100' | 62 | 60 | 63 | 60 |
| Goodrich ΔT(° F. over 100° F.): | | | | |
| 25' | 68 | 85 | 99 | 90 |
| 40' | 58 | 58 | 67 | 66 |
| 55' | 53 | 57 | 59 | 62 |
| 100' | 52 | 52 | 53 | 53 |

The data set forth in the table for the four samples tested indicate the greatly improved properties of the acid-containing compositions. Standard processing in the industry includes a 55 minute cure time. The results indicated that at this optimum cure time of 55 minutes, the tensile strength is increased by as much as 460 p.s.i. (compare Samples I and II). The 300% modulus is increased by as much as 220 p.s.i. (compare Samples I and IV). The ultimate percentage elongation is increased by 180 percentage points (compare Samples I and IV). The Goodrich heat build-up test indicates that the acid-containing compositions have acceptable heat build-up and hysteresis properties at the 55 minutes cure level. The sample tested for cold flow showed a remarkable improvement in properties over the untreated sample. The commercial material without acid additives (Sample I) flowed to one-half of its original height in 21 days, while the acid-containing compositions (Samples II–IV) showed no signs of flowing even after 50 days.

As many embodiments of this invention may be made without departing from the spirit and scope thereof, it is to be understood that the invention includes all such modifications and variations as come within the scope of the appended claims.

What is claimed is:

1. An improved cis 1,4-polybutadiene rubber composition prepared from a cis 1,4-polybutadiene in which at least 50% of the butadiene-1,3 units are joined cis-1,4, and between 2.5 parts and 10 parts per 100 parts of polybutadiene, by weight, of thiolbenzoic acid.

2. The composition of claim 1 having a Mooney viscosity range of between 20 and 100.

3. The composition of claim 1 wherein at least 85% of the butadiene-1,3 units are joined cis-1,4.

4. The composition of claim 3, having a Mooney viscosity range of between 30 and 50.

5. The composition of claim 1 containing between about 3 parts and 7 parts of thiolbenzoic acid.

6. The composition of claim 4 containing between about 3 parts and 7 parts of thiolbenzoic acid.

7. The composition of claim 4 wherein about 2.5 parts of thiolbenzoic acid is used.

8. The composition of claim 4 wherein about 3.8 parts of thiolbenzoic acid is used.

9. The composition of claim 4 wherein about 7 parts of thiolbenzoic acid is used.

10. The composition of claim 2 wherein the composition also contains carbon black, a vulcanization agent, an accelerator, an anti-oxidant, and a softening agent.

11. The process for preparing an improved cis 1,4-polybutadiene rubbery composition, comprising milling, at temperatures between 70° F. and 300° F., 100 parts by weight of a cis 1,4-polybutadiene homopolymer in which at least 50% of the butadiene-1,3 units are in the cis form, together with between 2.5 parts and 10 parts of thiolbenzoic acid.

12. The process of claim 11 wherein between 3 and 7 parts of thiolbenzoic acid is milled with the polybutadiene.

13. The process of claim 11 wherein the cis 1,4-polybutadiene milled contains at least 85% of the butadiene-1,3 units joined cis-1,4.

No references cited.

MORRIS LIEBMAN, *Primary Examiner.*

J. S. WALDRON, *Assistant Examiner.*